United States Patent
Cottet et al.

(10) Patent No.: US 11,780,562 B2
(45) Date of Patent: *Oct. 10, 2023

(54) TURBOMACHINE MODULE FOR A PROPELLER HAVING VARIABLE-PITCH BLADES AND TURBOMACHINE COMPRISING SAME

(71) Applicant: SAFRAN AIRCRAFT ENGINES, Paris (FR)

(72) Inventors: Clement Cottet, Moissy-Cramayel (FR); Thierry Georges Paul Papin, Moissy-Cramayel (FR); Regis Eugene Henri Servant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/626,348

(22) PCT Filed: Jul. 13, 2020

(86) PCT No.: PCT/FR2020/051264
§ 371 (c)(1),
(2) Date: Jan. 11, 2022

(87) PCT Pub. No.: WO2021/009460
PCT Pub. Date: Jan. 21, 2021

(65) Prior Publication Data
US 2022/0135207 A1 May 5, 2022

(30) Foreign Application Priority Data

Jul. 15, 2019 (FR) ..................................... 1907946

(51) Int. Cl.
*B64C 11/44* (2006.01)
*F01D 7/00* (2006.01)
(Continued)

(52) U.S. Cl.
CPC .............. *B64C 11/06* (2013.01); *B64C 11/44* (2013.01); *F01D 7/00* (2013.01); *F02K 3/06* (2013.01);
(Continued)

(58) Field of Classification Search
None
See application file for complete search history.

(56) References Cited

U.S. PATENT DOCUMENTS 8,371,105 B2 2/2013 Glynn et al.
10,288,087 B2 5/2019 Suciu et al.
(Continued)

FOREIGN PATENT DOCUMENTS

EP 3165452 A1 5/2017
FR 2937678 A1 4/2010
(Continued)

OTHER PUBLICATIONS

International Search Report received for PCT Patent Application No. PCT/FR2020/051264, dated Oct. 27, 2020, 6 pages (2 pages of English Translation and 4 pages of Original Document).

*Primary Examiner* — Michael Lebentritt
(74) *Attorney, Agent, or Firm* — Womble Bond Dickinson (US) LLP

(57) ABSTRACT

The invention relates to a turbomachine module (1), comprising: —a rotating housing (7-8) supporting a propeller provided with a plurality of blades (5), —a system for varying the pitch of the propeller blades (5), the system comprising a control means, and a mechanism for varying the pitch of the propeller blades, characterised in that the system is supported by the rotary housing (7-8), in that the control means comprise an annular row of rotary actuators (16), and in that the mechanism for varying the pitch of the blades comprises a synchronisation ring (11) that is driven to (Continued)

rotate by rotary output shafts (17) of the actuators (16), the synchronisation ring (11) being guided in rotation relative to the rotary housing (7-8) by guide means and meshed by a first toothing (13) with pinions (14) of the blades (5).

13 Claims, 1 Drawing Sheet

(51) Int. Cl.
  *B64C 11/06* (2006.01)
  *F02K 3/06* (2006.01)
(52) U.S. Cl.
  CPC .... *F05D 2220/323* (2013.01); *F05D 2260/74* (2013.01); *F05D 2260/79* (2013.01); *F05D 2270/46* (2013.01)

(56) References Cited

U.S. PATENT DOCUMENTS

| | | | | |
|---|---|---|---|---|
| 2012/0121417 | A1* | 5/2012 | Lafont | F01D 21/045 |
| | | | | 416/142 |
| 2018/0334915 | A1* | 11/2018 | Bordoni | B64C 11/385 |
| 2020/0338639 | A1* | 10/2020 | Friesth | B22F 5/009 |
| 2021/0017949 | A1* | 1/2021 | Servant | F03B 15/00 |

FOREIGN PATENT DOCUMENTS

| | | | |
|---|---|---|---|
| FR | 2997724 A1 | 5/2014 | |
| FR | 3046406 A1 | 7/2017 | |

\* cited by examiner

TURBOMACHINE MODULE FOR A PROPELLER HAVING VARIABLE-PITCH BLADES AND TURBOMACHINE COMPRISING SAME

TECHNICAL FIELD OF THE INVENTION

The invention relates to the variable pitch propellers for turbomachines, whether the rotor is shrouded or not. It focuses more particularly on the mechanisms for controlling the pitch of the blades of these propellers.

TECHNICAL BACKGROUND

The technical background comprises in particular the documents U.S. Pat. No. 10,288,087B2 and U.S. Pat. No. 8,371,105B2.

It is known to increase the bypass ratio of the double-flow engines, whether they are of the turboprop engine type or with a non-shrouded propeller, to improve their propulsive efficiency and reduce their specific consumption. This characteristic allows to increase the bypass ratio of the engines, but it also has the disadvantage of working with reduced speeds of the fan or of the propeller, to decrease its compression ratio and thus generate aerodynamic instabilities, for example reducing the pumping margins.

One solution to these instabilities is to use a variable pitch propeller. The pitch change mechanism is therefore becoming a major technological building block for these engines.

The propellers consisting of a fan blading on the turbojet engines or the propellers on the open-rotor type turbomachines (with unshrouded propeller) comprise a large number of blades. In addition, the pitch change system has to counteract high forces due to the size of the blades and the power transmitted. Also, the system must allow for a large range of variation in the pitch angle, between extreme operating positions.

In addition to systems using individual actuators per blade, which pose problems of integration, of power supply to the actuators and of complexity for the adjustment, various systems are known which use a synchronization ring to change the pitch of an annular row of blades or vanes as a whole. For example, the document FR-A1-2 937 678 describes a system using a rotating annulus driven by cylinders in a plane transverse to the longitudinal axis and the document FR-A1-2 997 724 describes a system using an annulus driven in axial translation by a longitudinal cylinder.

The known systems pose various problems of overall dimension, complexity and adjustment or conveying the energy to the various actuators, especially in the case of hydraulic actuators.

The purpose of the invention is to respond to the problems of integration in the space of the hub of the propeller, of energy conveying to one or more actuators, as well as to allow precise adjustment of the pitch of the blades and a compensation for any manufacturing clearances.

A second objective is to minimize the impact of the installation of a pitch change mechanism on the modularity of the engine and its maintenance.

The solution also aims to improve the reliability of the system, in particular in the event of actuator breakdown.

SUMMARY OF THE INVENTION

To this end, the invention relates to a module for a turbomachine with a longitudinal axis, the module comprising:
- a rotating casing that is rotatable about the longitudinal axis and supporting a propeller provided with a plurality of blades,
- a system for changing the pitch of the blades of the propeller comprising:
  - a control means, and
  - a mechanism for varying the pitch of the blades of the propeller.

The invention is remarkable in that said system is supported by the rotating casing, in that said control means comprise an annular row of rotating actuators distributed about said longitudinal axis, and in that said mechanism for varying the pitch of the blades comprises a synchronization ring which is rotatably driven by rotating output shafts of the actuators, the synchronization ring being rotatably guided with respect to said rotating casing by guiding means and meshed by a first toothing with pinions of the blades.

The use of a synchronization ring allows the pitch of all the blades to be changed in a synchronized manner.

The fact that the synchronization ring is rotatably guided on the rotating casing allows the assembly comprising the rotating casing and the rotating mechanism of the blades to form a functional assembly as close as possible to the blades with a reduced overall dimension. This facilitates its integration on the turbomachine.

In addition, the rotational guidance of the ring on the rotating casing contributes to the rigidity of the mechanism for a precise pitch of the blades. Adding to this the fact that the synchronization ring drives the blades by a gear on the pivots, the device ensures, thanks to the precision of the gear meshes, a very good relative error in the pitch of the blades.

Moreover, these characteristics allow the installation of an interface, as close as possible to the blades, to lock all the kinematics and block the position of the latter in case of emergency.

As far as the sizing of the actuators is concerned, it is possible to minimize the torque they have to provide by adjusting the geometric parameters of the ring gear and of its toothings.

Finally, the use of an annular row of several actuators that mesh on the same synchronization wheel allows, in case of breakdown of one actuator, to continue to operate with the other actuators. This improves the reliability in case of breakdown. On the other hand, within the scope of the actuation strategy, this arrangement may allow for a rotation between the actuators that provide the power to let the others cool down. This is an important point with electric actuators.

Preferably, the synchronization ring is surrounded by a hub belonging to the rotating casing and supporting the blades.

This arrangement corresponds to a compact layout of the module, which is easier to integrate and more rigid to ensure the precision of the pitch of the blades.

Advantageously, the synchronization ring comprises a radially external peripheral edge cooperating with at least one bearing supported by said rotating casing to form said rotatably guiding means.

By shifting the guiding means to the periphery of the synchronization ring, the transverse forces and the torques exerted to hold this synchronization ring are distributed over a relatively large surface area. This contributes to the robustness and the rigidity of the device.

Advantageously, the output shafts of the actuators have axes of rotation substantially parallel to said longitudinal axis.

Advantageously, the actuators are supported by a wall of said rotating casing, this wall being substantially perpendicular to said longitudinal axis.

Preferably, the first toothing for meshing with said pinions of the blades is frustoconical.

Advantageously, the pinions of the blades are conical pinions which are directly attached to the roots of the blades.

Preferably, the synchronization ring comprises a second toothing which is cylindrical and meshes with said output rotating shafts.

Preferably, said second toothing is located on a radially internal peripheral edge of the synchronization ring.

The invention also relates to an aircraft turbomachine, comprising at least one module as described above.

BRIEF DESCRIPTION OF FIGURES

Further characteristics and advantages of the invention will become apparent from the following detailed description, for the understanding of which reference is made to the attached drawings in which.

DETAILED DESCRIPTION OF THE INVENTION

Figure 1:
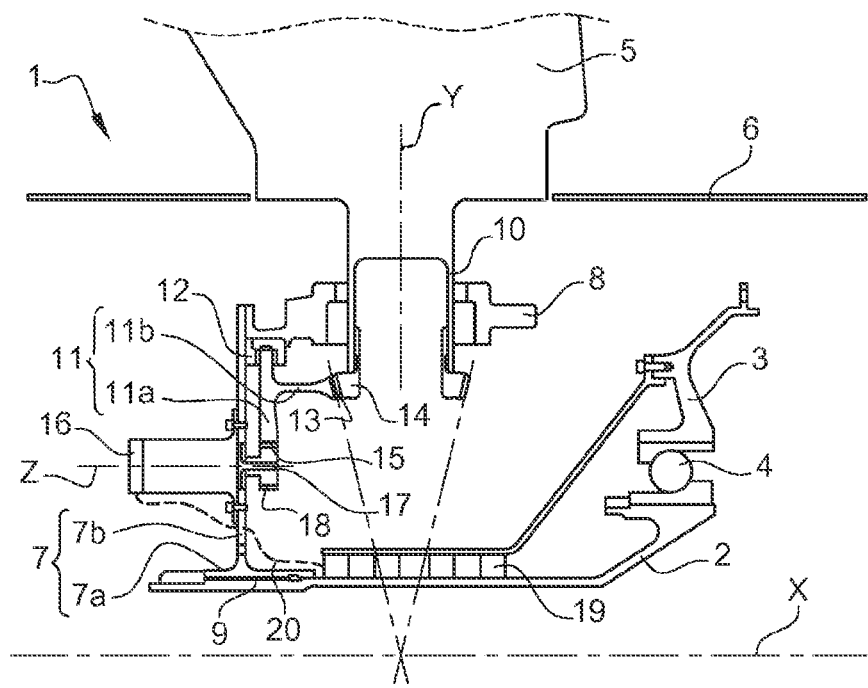
FIG. 1 shows schematically an axial half section of a module according to the invention.

FIG. 1 shows a general view of an embodiment of a device 1 according to the invention, rotatably driven about the longitudinal axis X of a turbomachine by a shaft 2 emerging from the engine portion, not shown. The shaft 2 is itself rotatably guided on a stationary casing 3 of the turbomachine by bearings 4. The propeller is placed here in front of the engine. The blades 5 of the propeller are rotatably driven about the longitudinal axis X, and are designed to have a variable pitch each about a radial axis Y rotating with the propeller. A cover 6 isolates the device itself from the air flow in which the blades 5 of the propeller work.

The device 1 comprises a trunnion 7, centred on the longitudinal axis X, which connects the shaft 2 to the hub 8 of the propeller, supporting the blades 5. The trunnion 7 comprises a substantially cylindrical central portion 7a which is fitted onto the shaft 2. The connection 9 is made by splines, which allows the trunnion 7 to be mounted/dismounted from the front of the shaft 2. It is held in axial position by a nut. The trunnion 7 comprises a disc 7b which is connected to the hub 8, approximately in line with the spline-shaft connection 9. The disc 7b is positioned in front of the hub 8. A bolted connection allows the hub 8 to be centred and attached on the periphery of the disc 7b. The hub 8 is a structural part comprising an annular row of circular housings around its periphery with known and non-detailed means, such as roller bearings, for mounting pivots 10 rotating with the blades 5 about the radial axes Y. The trunnion 7 and the hub 8 form a rotating casing connecting the blades 5 of the propeller to the shaft 2 of the engine.

To manufacture the pitch change mechanism, a synchronization ring 11 is mounted on the trunnion 7. The synchronization ring 11 is formed here by a disc 11a supporting a cylindrical tab 11b on its rear face.

The synchronization ring 11 is mounted between the disc 7b of the trunnion and the pivots 10 of the blades 5, under the hub 8. The periphery of the disc 11a of the synchronization ring 11 is held in a bearing 12 attached to the periphery of the disc 7a of the trunnion 7, under the hub 8. This bearing 12 comprises means, not detailed here, in particular a groove and roller bearings, which hold the synchronization ring 11 centred on the axis X and in a determined axial position. The outer periphery of the disc 11a of the synchronization ring 11 forms a track for the roller bearings of said bearing 10. These means therefore allow the synchronization ring 11 to rotate freely about the longitudinal axis X with respect to the trunnion 7, while taking up the forces to which it is subjected in order to maintain it in an axial position.

The cylindrical tab 11b of the synchronization ring 11 supports a toothed ring 13 at its free end. Here, the surface supporting the teeth of the toothed ring 13 is frustoconical about the axis X, it follows a cone whose generatrix lines pass through the intersection between the axis X and the plane of the axes Y of the pivots 10 of the blades 5. The toothed ring 13 meshes with the toothing of conical pinions 14 attached to the end of the pivot 10 of each blade 5. The surface supporting the teeth of the pinion 14 of each pivot 10 follows a cone centred on the axis Y of the pivot and whose generatrix lines pass through the intersection between the axis X and the plane of the axes Y of the pivots of the blades.

The precision of the meshing of the synchronization ring 11 with the conical pinions 14 allows to obtain a good precision of the blade to blade pitch, with a very low relative error.

Furthermore, the disc 11a of the synchronization ring 11 comprises a central recess. The disc supports an inner and axial toothed ring 15 on the periphery of this central recess.

The device also comprises an annular row of rotating actuators 16 having axes Z parallel to the axis X of the turbomachine, one of which is shown in FIG. 1. The rotating actuators 16 are attached to the disc 7b of the trunnion 7, in front of it. Each drives an output shaft 17 in rotation about its axis Z, which passes through the disc 7b of the trunnion and supports a toothed wheel 18 which meshes with the inner toothed ring 15 of the disc 11b of the synchronization ring 11.

For example, eight actuators 16 identical to the one shown are attached to the disc of the trunnion, distributed circumferentially in a ring at the front of the trunnion. The number of actuators and their size can vary depending on the geometrical parameters of the device and the individual power set for each actuator. The number of actuators can be typically three, six or twelve.

These are electric actuators. Rotating power transfer means 19 are installed at the rear of the trunnion 7, between the shaft 2 and the stationary casing 3 of the turbomachine. Wires 20 transmit the energy from these means 19 to the actuators 16. They are controlled in position around their axis of rotation Z by electrical pulses.

Alternatively, hydraulic actuators can be used. In this case, a rotating hydraulic transfer device must be installed between the stationary structure and the device to provide them power and to control them.

The assembly forms a module for supporting the blades 5 of the propeller with control of the pitch angle, the overall dimension of which is reduced to a small volume at the level of the hub 8 of the blades 5 of the propeller.

The trunnion 7 and the hub of the propeller 8 form a casing that rotates at the speed of the shaft 2 of the propeller. The actuators 16 are controlled to rotate their output shafts 17 at the same speed and by a same amount in a given direction according to the desired pitch angle. The rotation of the output shafts 17 leads to a rotation of the synchronization ring 11 in the reference frame of the rotating casing and, by the meshing of the synchronization wheel 11 on the pinions 14 of the pivots 10 of the blades 5, to a corresponding modification of the pitch of each blade 5 around the axis Y of its pivot 10.

By oversizing the actuators, this arrangement allows, in case of breakdown of one actuator, to continue operating with the other actuators. On the other hand, within the scope of the actuation strategy, this arrangement may allow for a rotation between the actuators that provide the power to let the others cool down. This is an important point with electric actuators.

Figure 2:
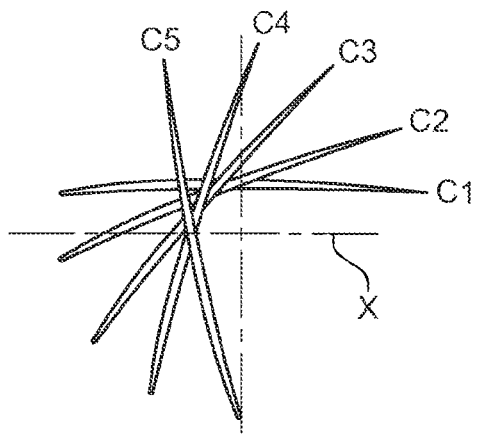
FIG. 2 shows schematically, in circumferential section, different pitch positions of the blades of a propeller using the invention.

The kinematics of the assembly allows the adjustment of the pitch angle over a large angular range. FIG. 2 illustrates different angular positions of the blades 5, for feathering C1, climb C2, take-off C3, ground C4 and reverse thrust C5 operating modes. The variation in the pitch angle is greater than 90° between the extreme positions. Furthermore, the rigidity of the assembly, in particular thanks to the bearing 12 for rotatably guiding the synchronization ring 11 on the trunnion 7 and to the connections by meshing on the toothings 13 and 15, allows, if necessary, to lock the entire kinematics and to block the pitch position of the blades 5 in case of emergency. The additional means to be installed on the trunnion 7 to perform this locking function in case of breakdown of the actuator are not described here.

Figure 3:
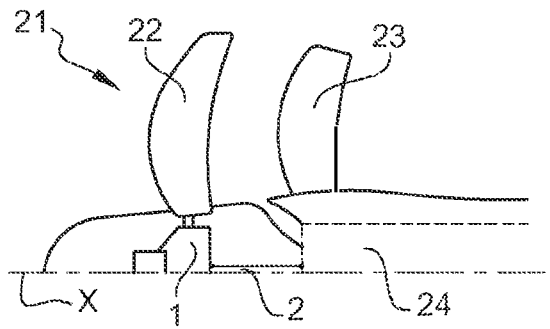
FIG. 3 shows a schematic longitudinal half-section of an open-rotor type turbomachine using the device of FIG. 1.
Figure 4:
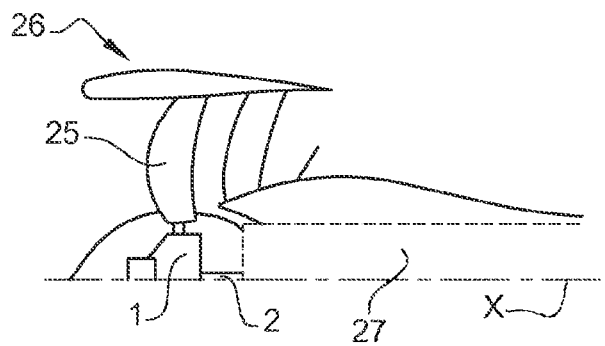
FIG. 4 shows a schematic longitudinal half-section of a turbomachine with a shrouded fan using the device of FIG. 1.

The device described above can be installed, for example, on a turbomachine 21 of the "open-rotor" type. FIG. 3 thus shows the device 1 placed under the upstream propeller 22 of such a turbomachine 21, with behind it a ring of stationary blades 23 rectifying the flow passing through the propeller 22 and the engine 24 itself, not detailed, which drives the propeller 22 via the shaft 2. Similarly, with reference to FIG. 4, the device 1 may be installed to drive the shrouded fan 25 of a double-flow turbomachine 26, the engine 27 of which is not detailed.

The invention claimed is:

1. A module for a turbomachine with a longitudinal axis, the module comprising:
   a rotating casing rotatable about the longitudinal axis and supporting a propeller provided with a plurality of blades,
   a system for changing the pitch of the blades of the propeller comprising:
   a control means, and
   a mechanism for varying the pitch of the blades of the propeller,
   wherein said system is supported by the rotating casing, in that said control means comprise an annular row of rotating actuators distributed about said longitudinal axis, and in that said mechanism for varying the pitch of the blades comprises a synchronization ring which is rotatably driven by rotating output shafts of the actuators, the output shafts of the actuators having axes of rotation substantially parallel to said longitudinal axis, the synchronization ring being rotatably guided with respect to said rotating casing by guiding means and meshed by a first toothing with pinions of the blades.

2. The module according to claim 1, wherein the synchronization ring is surrounded by a hub belonging to the rotating casing and supporting the blades.

3. The module according to claim 1, wherein the synchronization ring comprises a radially external peripheral edge cooperating with at least one bearing supported by said rotating casing to form said rotatably guiding means.

4. The module according to claim 1, wherein the actuators are supported by a wall of said rotating casing, this wall being substantially perpendicular to said longitudinal axis.

5. The module according to claim 1, wherein the first toothing for meshing with said pinions of the blades is frustoconical.

6. The module according to claim 1, wherein the pinions of the blades are conical pinions which are directly attached to roots of the blades.

7. The module according to claim 1, wherein the synchronization ring comprises a second toothing which is cylindrical and meshes with said output rotating shafts.

8. The module according to claim 7, wherein said second toothing is located on a radially internal peripheral edge of the synchronization ring.

9. An aircraft turbomachine comprising at least one module according to claim 1.

10. The module according to claim 2, wherein the hub comprises an annular row of circular housings around its periphery, each circular housing for mounting pivots rotating with the blades about radial axes.

11. The module according to claim 2, wherein the rotating casing comprises a trunnion, centered on the longitudinal axis, intended to connect a shaft of the turbomachine to the hub of the propeller supporting the blades, the trunnion comprises a substantially cylindrical central portion intended to be fitted onto the shaft and a disc connected to the hub, the synchronization ring being mounted on the trunnion.

12. The module according to claim 3, wherein the synchronization ring comprises a disc, the periphery of the disc of the synchronization ring being held in a bearing attached to the periphery of the disc of the trunnion, under the hub; and
   wherein the rotating casing comprises a trunnion, centered on the longitudinal axis, intended to connect a shaft of the turbomachine to the hub of the propeller supporting the blades, the trunnion comprises a substantially cylindrical central portion intended to be fitted onto the shaft and a disc connected to the hub, the synchronization ring being mounted on the trunnion.

13. The module according to claim 12, wherein the disc supporting a cylindrical tab on its rear face, the cylindrical tab of the synchronization ring supporting the first toothed ring meshing with pinions of the blades.

\* \* \* \* \*